US012429010B2

United States Patent
Baer et al.

(10) Patent No.: US 12,429,010 B2
(45) Date of Patent: Sep. 30, 2025

(54) AIR-COOLED, FOUR-STROKE AVIATION ENGINE

(71) Applicant: Textron Innovations Inc., Providence, RI (US)

(72) Inventors: Patrick Henry Baer, Clarkston, MI (US); Michael Glynn Glucksman, Montgomery, PA (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/745,150

(22) Filed: Jun. 17, 2024

(65) Prior Publication Data

US 2024/0337227 A1 Oct. 10, 2024

Related U.S. Application Data

(63) Continuation of application No. 17/873,705, filed on Jul. 26, 2022, now Pat. No. 12,012,910.

(Continued)

(51) Int. Cl.
*F02F 1/24* (2006.01)
*B64D 27/04* (2006.01)
(Continued)

(52) U.S. Cl.
CPC ............. *F02F 1/242* (2013.01); *B64D 27/04* (2013.01); *F01L 3/02* (2013.01); *F01L 3/08* (2013.01); *F02F 1/28* (2013.01); *F02F 1/4235* (2013.01)

(58) Field of Classification Search
CPC ...... F02F 1/242; F02F 1/28; F02F 1/40; F02F 3/26; F02F 3/28; F01L 3/02; F01L 3/08;
(Continued)

(56) References Cited

U.S. PATENT DOCUMENTS 3,658,046 A 4/1972 Winkler
5,138,990 A 8/1992 Smith, Jr. et al.
(Continued)

FOREIGN PATENT DOCUMENTS

EP 3636369 A1 4/2020
JP H04232227 A 8/1992
(Continued)

OTHER PUBLICATIONS

Grove-Aero-1.pdf: Facebook post dated Nov. 22, 2020 by Karl Grove; downloaded Aug. 17, 2022 from https://www.facebook.com/GroveAero/.
(Continued)

*Primary Examiner* — Grant Moubry
(74) *Attorney, Agent, or Firm* — BainwoodHuang

(57) ABSTRACT

An improved air-cooled aviation engine includes a compact combustion chamber having an intake valve opening, an exhaust valve opening, and a generally elliptical shape. The elliptical shape has a major axis and a minor axis, with the major axis intersecting both the intake valve opening and the exhaust valve opening. In some examples, the major axis is the same length or shorter than a diameter of a cylinder bore of the engine, and the minor axis is smaller than the major axis. Combustion is thus constrained to a smaller area than that of the cylinder bore.

11 Claims, 5 Drawing Sheets

Related U.S. Application Data

(60) Provisional application No. 63/203,610, filed on Jul. 27, 2021.

(51) Int. Cl.
*F01L 3/02* (2006.01)
*F01L 3/08* (2006.01)
*F02F 1/28* (2006.01)
*F02F 1/42* (2006.01)

(58) Field of Classification Search
CPC ..... F01P 1/08; F01P 1/02; F02B 61/04; F02B 23/06; F02B 23/0621; F02B 23/0675; F02B 23/0696; F02B 2023/102; F02B 2023/085; F02B 2275/40; B64D 27/04
See application file for complete search history.

(56) References Cited

U.S. PATENT DOCUMENTS

| | | | |
|---|---|---|---|
| 5,586,530 A | 12/1996 | Adachi et al. | |
| 5,638,787 A * | 6/1997 | Feuling | F01L 1/26 123/310 |
| 6,092,501 A * | 7/2000 | Matayoshi | F02B 23/104 123/301 |
| 6,199,544 B1 * | 3/2001 | Feuling | F02B 23/08 123/661 |
| 6,267,107 B1 * | 7/2001 | Ward | F02B 31/085 123/162 |
| 6,832,589 B2 * | 12/2004 | Kremer | F02F 1/06 123/193.6 |
| 7,165,528 B2 * | 1/2007 | Ward | F02M 69/08 123/48 B |
| 7,207,312 B2 * | 4/2007 | Inoue | F02B 23/08 123/310 |
| 7,284,524 B2 * | 10/2007 | Matas | F02F 1/30 123/193.5 |
| 8,082,908 B2 * | 12/2011 | Ward | F02M 35/1047 123/661 |
| 9,267,421 B2 | 2/2016 | Toda et al. | |
| 10,526,933 B2 | 1/2020 | Morii et al. | |
| 10,871,101 B2 | 12/2020 | Ambrazas et al. | |
| 2003/0070644 A1 | 4/2003 | Diehl et al. | |
| 2009/0229560 A1 | 9/2009 | Woodcroft | |
| 2017/0009649 A1 | 1/2017 | Gurney | |
| 2017/0067390 A1 | 3/2017 | Yamamoto | |
| 2018/0209312 A1 | 7/2018 | Hesher et al. | |
| 2019/0101047 A1 | 4/2019 | Ambrazas et al. | |
| 2019/0101048 A1 | 4/2019 | Ambrazas et al. | |
| 2019/0101049 A1 | 4/2019 | Ambrazas et al. | |
| 2020/0362734 A1 | 11/2020 | Koerner et al. | |

FOREIGN PATENT DOCUMENTS

| | | |
|---|---|---|
| WO | 2006093769 | 9/2006 |
| WO | 2009095573 | 8/2009 |

OTHER PUBLICATIONS

Grove-Aero-2.pdf: Facebook post dated Jun. 16, 2019 by Karl Grove; downloaded Aug. 17, 2022 from https://www.facebook.com/GroveAero/.

Illustrated Parts Catalog for Rotax Engine Type 912 and 914 Series, Fourth Revision, dated Aug. 1, 2021, pp. 76 and 79.

Notification of Transmittal of the International Search Report and Written Opinion of the International Searching Authority, or the Declaration; PCT Application No. PCT/US2022/038333, dated Nov. 8, 2022, 12 pages.

* cited by examiner

AIR-COOLED, FOUR-STROKE AVIATION ENGINE

CROSS REFERENCE TO RELATED APPLICATIONS

This application is a continuation of earlier-filed U.S. application Ser. No. 17/873,705, filed on Jul. 26, 2022, and U.S. Provisional Application No. 63/203,610, filed on Jul. 27, 2021, the contents and the teachings of which are hereby incorporated by reference in their entirety.

BACKGROUND

The invention relates generally to spark-ignited, four stroke, air-cooled aviation engines, and more particularly to such engines that have compact combustion chambers.

Air-cooled, four-stroke engines are popular choices for powering airplanes, helicopters, UAVs (unmanned aerial vehicles), and the like. A typical air-cooled engine may include an aluminum cylinder head with heat fins exposed to ambient air. Heat from combustion flows into the aluminum cylinder head and out to the surrounding air via conduction through heat fins.

A typical air-cooled engine uses an open combustion chamber with widely spaced spark plugs. Two spark plugs are used per cylinder to allow for redundant operation, such that the engine can continue working even if one spark plug fails.

SUMMARY

Unfortunately, the above-described air-cooled aviation engine has certain deficiencies. The open combustion chamber can require flame fronts, initiated by spark plugs, to travel long distances to traverse the entire volume of the chamber. To accommodate longer durations required to traverse these distances, spark-plug timing is often advanced considerably, with spark plugs firing 20 degrees or more prior to top dead center (TDC) of the pistons within their respective cylinders. Such advanced firing of spark plugs results in negative work that subtracts from the positive mechanical work that the engine performs. Further, the relatively long distance needed for flame fronts to travel toward an exhaust valve in the combustion chamber means that uncombusted fuel-air mixtures remain in contact with hot exhaust components longer than desired. This can cause the hot fuel-air mixture near the exhaust components to ignite prematurely, resulting in knock. Although knock can be remedied at least in part through the use of higher-octane fuel, such fuel is more expensive than lower-octane fuel and is difficult to obtain in some parts of the world.

To address the above deficiencies at least in part, an improved air-cooled aviation engine includes a compact combustion chamber having a generally elliptical shape. The combustion chamber is formed by a cylinder head and a piston when the piston is disposed at or near an uppermost position within a cylinder bore. The cylinder head includes an intake valve opening and an exhaust valve opening. The elliptical shape has an area smaller than that of the cylinder bore and has a major axis that intersects both the intake valve opening and the exhaust valve opening.

The compact combustion chamber brings several advantages. Flame fronts initiated by spark-plug firing can traverse the entire volume of the combustion chamber in little time, completing combustion quickly and reducing the degree to which spark-plug timing may be advanced (e.g., from 20 to 15 degrees before TDC). The engine thus performs less negative work than in prior designs, resulting in higher efficiency. Further, the compactness of the combustion chamber means that the hot exhaust components have little time to heat the fuel-air mixture, reducing heat rejection and preventing knocking. Prevention of knocking allows less expensive, lower octane fuel to be used, substantially reducing costs of operation and increasing availability. Many other improvements and advantages are contemplated.

Certain embodiments are directed to an air-cooled aviation engine. The engine includes a cylinder head having an intake valve opening, an exhaust valve opening, a plurality of spark plugs, and an interior surface. The engine further includes a cylinder bore having a cross-sectional area and containing a piston configured to move reciprocally within the cylinder bore. The engine still further includes a combustion chamber having an upper region defined by the interior surface of the cylinder head and a lower region defined by the piston when the piston is in an uppermost position within the cylinder bore. The combustion chamber has an elliptical shape that extends over a cross-sectional area smaller than the cross-sectional area of the cylinder bore, and the elliptical shape has a major axis that intersects the intake valve opening and the exhaust valve opening.

In some examples, the cylinder head has a flat shoulder region that abuts a flat outer region of the piston when the piston is in the uppermost position within the cylinder bore, and the flat shoulder region and the flat outer region constrain the combustion chamber to the elliptical shape.

In some examples, each of the plurality of spark plugs includes respective electrodes, and the electrodes of the plurality of spark plugs extend below the interior surface of the combustion chamber.

In some examples, the electrodes of the plurality of spark plugs are disposed closer to the exhaust valve opening than to the intake valve opening.

In some examples, the piston includes a depression beneath the electrodes of each of the plurality of spark plugs, and at least a portion of the piston is elevated relative to the depression.

In some examples, the cylinder bore has a center line and a radius, and the electrodes of the plurality of spark plugs are disposed at respective distances from the center line that are less than 65% of the radius of the cylinder bore.

In some examples, the cylinder head further includes an intake valve seat that fits within the intake opening and an exhaust valve seat that fits within the exhaust opening.

In some examples, the intake valve seat and the exhaust valve seat are each composed at least in part of copper-infiltrated powdered metal and/or solid alloy that includes copper.

In some examples, the intake valve seat and the exhaust valve seat each have a respective inner region, each inner region having multiple discretely angled surfaces.

In some examples, the cylinder head further includes an intake valve arranged to selectively admit intake air into the combustion chamber via the intake valve opening. The intake valve has an intake valve stem and an intake valve head, and the intake valve stem has a diameter of less than 9 mm. In such examples, the cylinder head further includes an exhaust valve arranged to selectively allow exhaust gases to be expelled from the combustion chamber via the exhaust valve opening. The exhaust valve has an exhaust valve stem and an exhaust valve head, and the exhaust valve stem has a diameter of less than 9 mm.

In some examples, the intake valve head and the exhaust valve head have multiple discretely-angled surfaces adjacent to contact regions with the respective valve seats.

In some examples, the cylinder head includes an exhaust valve-stem guide around the exhaust valve stem. The exhaust valve-stem guide is composed at least in part of copper and produced as a powdered metal and/or solid alloy.

In some examples, each of the intake valve stem and the exhaust valve stem includes a triple-bead attachment to a respective valve retainer, each triple-bead attachment constructed and arranged to facilitate rotation of the respective valve.

In some examples, the engine further includes a high-tumble intake port coextensive with the intake valve opening of the cylinder head. The high-tumble intake port is constructed and arranged to induce vertical currents within the combustion chamber.

Other embodiments are directed to an air-cooled aviation engine that includes multiple cylinders, where each cylinder includes a cylinder head having an intake valve opening, an exhaust valve opening, a plurality of spark plugs, and an interior surface. The engine further includes a cylinder bore having a cross-sectional area and containing a piston configured to move reciprocally within the cylinder bore. The engine still further includes a combustion chamber having an upper region defined by the interior surface of the cylinder head and a lower region defined by the piston when the piston is in a substantially uppermost position within the cylinder bore. The combustion chamber has an elliptical shape that extends over a cross-sectional area smaller than the cross-sectional area of the cylinder bore, and the elliptical shape has a major axis that intersects the intake valve opening and the exhaust valve opening.

Still other embodiments are directed to an aircraft that includes an air-cooled aviation engine in accordance with any of the examples above, in any combination.

Certain embodiments are directed to an air-cooled aviation engine, such as one having the features described in any of the examples above, in any combination. The engine may include any number of chambers of the kind described (e.g., any number of cylinders), arranged in any manner (e.g., straight, opposed, V-shaped, W-shaped, radially-shaped, etc.).

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views. The drawings are not necessarily to scale, emphasis instead being placed upon illustrating the principles of various embodiments.

DETAILED DESCRIPTION

Figure 1:
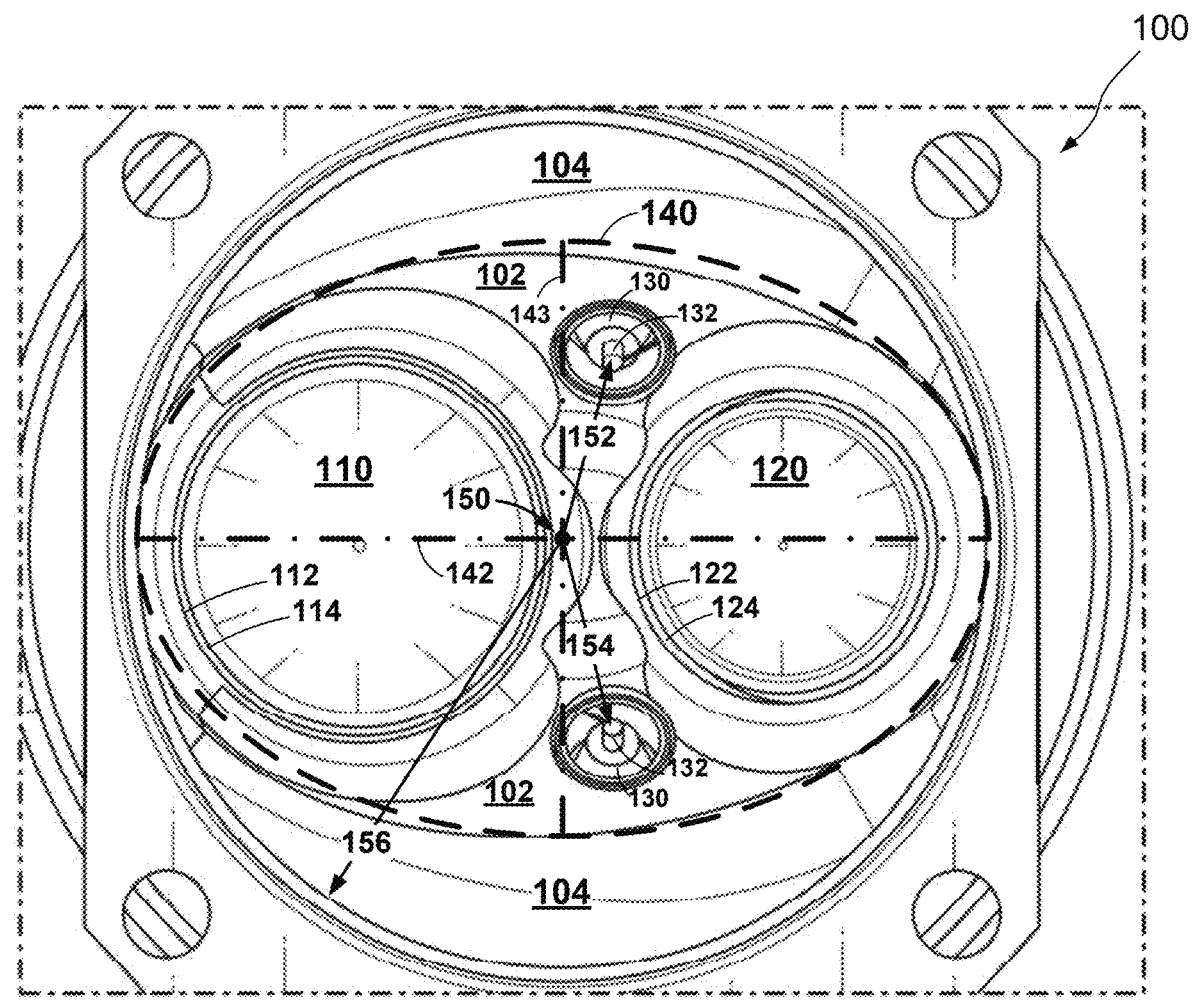
FIG. 1 is a bottom view of a cylinder head of an air-cooled, aviation engine according to an embodiment of the present disclosure.

Embodiments of the improved technique will now be described. One should appreciate that such embodiments are provided by way of example to illustrate certain features and principles but are not intended to be limiting.

An improved technique provides an air-cooled aviation engine that includes a compact combustion chamber having a generally elliptical shape. The combustion chamber is formed by a cylinder head and a piston when the piston is disposed at or near an uppermost position within a cylinder bore. The cylinder head includes an intake valve opening and an exhaust valve opening. The elliptical shape has an area smaller than that of the cylinder bore and has a major axis that intersects both the intake valve opening and the exhaust valve opening.

In some examples, the engine includes spark plugs, and the spark plugs have electrodes that are placed closer to the exhaust valve than to the intake valve. Such placement means that there is little time for hot exhaust components to heat the fuel-air mixture, reducing heat rejection and preventing knocking.

In some examples, the spark plugs are disposed parallel to a minor axis of the elliptical region and are placed closer to the exhaust valve than to the intake valve.

In some examples, the piston has a top surface in which one or more depressions are formed. In some examples, the depressions have a shape that substantially mirrors a shape of the inside of the cylinder head.

In some examples, the cylinder head includes valve seats composed at least in part of copper-infiltrated powdered metal. Such copper-infiltrated powdered metal has higher thermal conductivity than stainless steel (e.g., 130% higher) but provides similar wear resistance. The valve seats may be thermal interference-fit into the cylinder head, contacting the cylinder head over a large area and forming a low thermal-resistance attachment. The valve seats may thus provide a higher thermal-conductivity path between valve heads and the surrounding cylinder head.

In some examples, the valve seats have a narrow profile, exposing less surface area to combustion and experiencing less direct heating.

One of the functions of the valve seats is to perform heat-sinking that cools the valve heads. In some examples, the back sides of the valve heads includes a flat region that matches a correspondingly flat region of the valve seats. This contact regions enable heat to flow from valve heads into valve seats, and then into the engine block, where the heat is radiated into ambient air through heat fins. Additional angles added adjacent to the contact area (multi-angled design) provides a Venturi shape for more efficient air flow.

In some examples, the valves include narrow valve stems. Narrower valve stems reduce mass of the valves and enable them to be actuated more aggressively by the camshaft, such that the valves can be opened and closed sharply (at high rates). This feature helps to ensure that valves are not kept open or closed longer than necessary. For example, valves remain seated longer during each combustion cycle, providing more time for heat to conduct into the valve seat and cylinder head. Having the valves seated longer also increases the effective compression and expansion ratios, improving efficiency. Further, narrower stems expand less with increases in temperature, helping them to maintain alignment and cylindricity, and reducing valve distortion, leakage, and wear. They also block less space in intake and exhaust ports and thus promote more effective breathing.

In some examples, one or both valves have valve stems and high thermal-conductivity valve-stem guides, such as those made from copper-infiltrated powdered metal and/or high thermal-conductivity solid copper alloy, such as brass billet. In some examples, a valve stem may have an elongated, hollow internal region that contains sodium. When the valve stem heats, the sodium melts and sloshes within the hollow region, picking up heat from the valve head. The heat is transferred up the valve stem and laterally to the high thermal conductivity valve guides and then into the cylinder head.

In some examples, the valve stems are actuated by a camshaft, which opens and closes the respective valves through respective cams and levers. Springs bias the valves closed, and the rotating cam shaft forces them open through the levers.

In some examples, the valve stems are free to rotate, and repetitive compression and expansion of the valve springs gradually rotates the valves, e.g., at a rate of between 0.25 and 5 rotations per minute. Rotation of valves in this manner tends to distribute heat more evenly within valve heads and tends to wipe clean any deposits that form in the sealing area between valve heads and valve seats.

In some examples, the valve stems are coupled to respective springs via a triple-bead design. The end of each valve stem has three grooves for engaging a key that attaches the valve stem to an upper spring seat, reducing stress in the valve stem and increasing valve rotation as compared with single-bead designs.

In some examples, valve stems are isolated from oil that bathes an upper valvetrain via molded elastomer rings or other seals. For example, each valve stem guide has a respective seal. The seal prevents low-octane oil from leaking past the valves into the combustion chamber.

In some examples, an intake port into the combustion chamber creates high-tumble, vertically-rolling currents within the combustion chamber. Such rolling currents tend to cause fuel within the fuel-air mixture to migrate close to the spark plugs (by centrifuging action), promoting effective ignition.

In some examples, the spark plugs have electrodes that extend into the combustion chamber, promoting direct propagation of flame fronts. For example, ends of the plugs may be flush with the combustion chamber with electrodes extending into the main chamber volume.

In some examples, pistons are provided with dual compression rings (e.g., composed of steel). Such compression rings prevent gases from entering the space within the bores alongside the pistons. They also avoid blow-by of combustion gases around the pistons. In some examples, each piston includes a separate oil-control ring (e.g., composed of stainless steel). The oil-control ring may be placed below the compression rings on each piston and serves to prevent oil in the crankcase from seeping up and around the piston and into the combustion chamber.

In some arrangements, the valves are arranged at an angle relative to each other. In other arrangements, the valves are arranged in parallel to each other and to the direction of movement of the piston.

The above and additional features will now be described with reference to the accompanying figures.

Figure 2A:
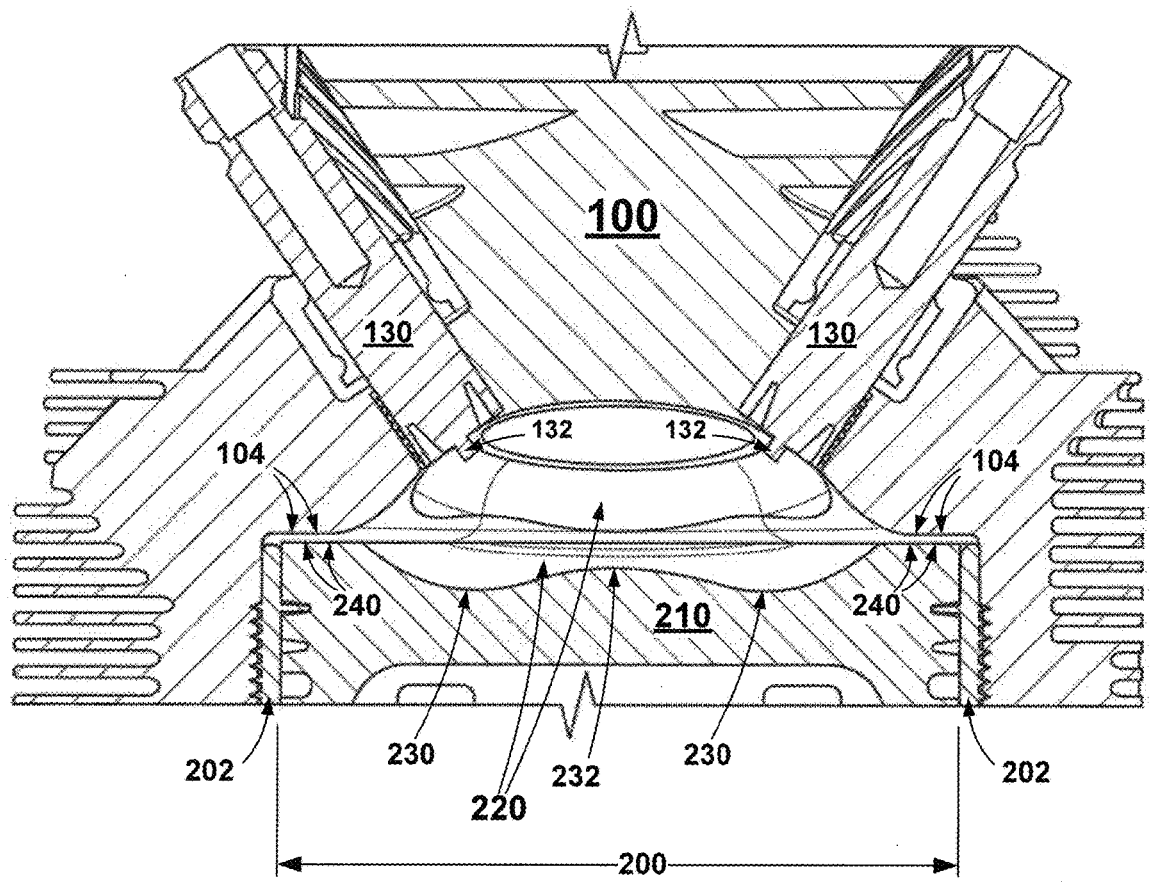
FIGS. 2a and 2b are sectional, side views of the embodiment of FIG. 1, with the section taken along a plane of the spark plugs of FIG. 1.
Figure 2B:
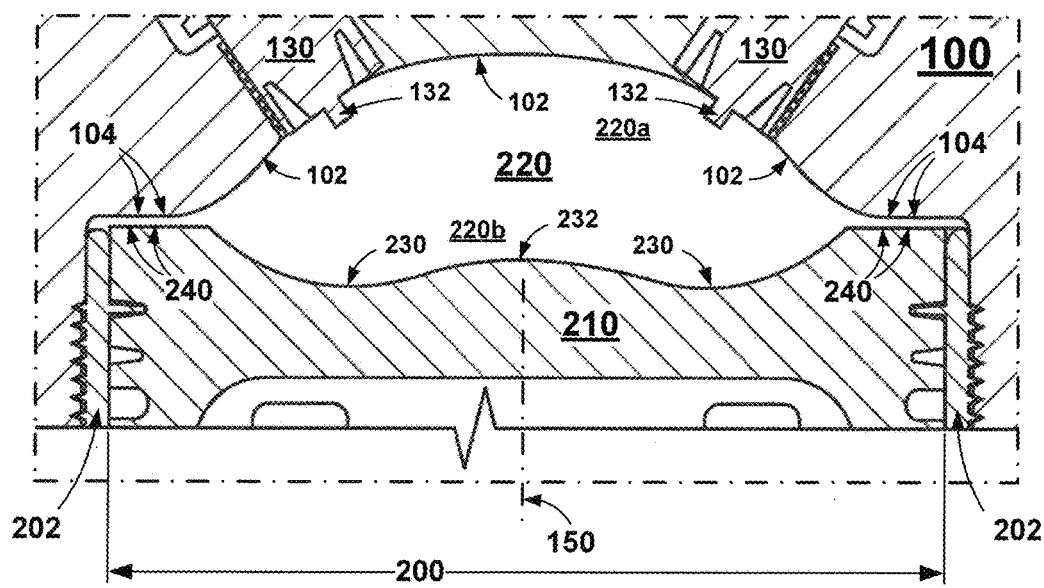

FIG. 1 shows an example cylinder head 100 of an engine in accordance with certain embodiments. The depicted cylinder head 100 is shown from the bottom. Thus, the part facing the reader is the part that normally faces toward a cylinder bore 200 (FIGS. 2a and 2b). An intake valve 110 is shown to the left, and an exhaust valve 120 is shown to the right. The intake valve 110 sits within an intake valve seat 114, which is disposed within an intake valve opening 112. Likewise, the exhaust valve 120 sits within an exhaust valve seat 124, which is disposed within an exhaust valve opening 122. In an example, the valve seats 114 and 124 are thermally interference fit into the respective valve openings 112 and 124, although other attachment modalities may be used.

Spark plugs 130 are disposed between the two valves 110 and 120. Each spark plug 130 includes electrodes 132, e.g., a pair of electrodes for each spark plug. As shown, the spark plugs 130 may be placed such that the electrodes 132 are closer to the exhaust valve 120 than they are to the intake valve 110. Although two spark plugs 130 are shown, alternative embodiments may include greater than two spark plugs.

The cylinder head 100 participates in defining a combustion chamber having an elliptical shape 140. The elliptical shape 140 has a major axis 142 as well as a minor axis 143. As shown, the major axis 142 intersects the valves 110 and 120. In some examples, the major axis 142 has a length that substantially matches a diameter of the cylinder bore 200. In other examples, the major axis 142 is smaller than the diameter of the cylinder bore 200. One should appreciate that the elliptical shape 140 need not be a perfect ellipse. Rather, all that is required is that the shape 140 be generally the shape of an ellipse, i.e., curved and longer in one direction (the major axis) than along a perpendicular direction (the minor axis).

As further shown in FIG. 1, a center line 150 (shown as a point) of the cylinder bore 200 is located along the major axis 142 near the intake valve 110. The electrodes 132 of top and bottom spark plugs 130 are disposed at respective radial distances 152 and 154 from the center line 150. Also shown is a radius 156 of the cylinder bore 200, relative to the same center line 150.

In some examples, the cylinder head 100 is distinguished from prior designs in its placement of electrodes 132. For example, the radii 152 and 154 may be less than 65% of the radius 156 of the cylinder bore 200. In some examples, the radii 152 and 154 may be less than 50% of the radius 156 of the cylinder bore 200. Electrodes 132 are thus more centrally located within the cylinder head 100 than is typical, and this more central location promotes more uniform and efficient combustion.

The cylinder head 100 has an interior surface 102 within the bounds of the elliptical shape 140, as well as a flat shoulder region 104 outside the bounds of the elliptical shape 140. Typically, combustion occurs within the region defined by the interior surface 102 (within the ellipse) but not within the region 104 (outside the ellipse). Thus, combustion is normally constrained to the area of the ellipse 140, which is less than the area of the cylinder bore 200 (as defined by radius 156). Confining the area in which combustion occurs further promotes efficiency, e.g., by reducing path lengths of combustion fronts.

FIGS. 2a and 2b show respective cross-sectional views of the cylinder head 100 of FIG. 1, with the section in each figure taken through the spark plugs 130. FIG. 2b is a magnified view of portions of FIG. 2a, with contour lines and other details removed.

As shown, a combustion chamber 220 is formed between the cylinder head 100 and a piston 210. The combustion chamber 220 has an upper region 220a, defined by the above-described interior surface 102, as well as a lower region 220b, defined by the piston 210.

The piston 210 is configured to move reciprocally within the cylinder bore 200, which is defined by a cylinder barrel 202. In the figures, the piston 210 is shown in its uppermost position, which corresponds to top dead center (TDC).

With the piston 110 in its uppermost position, the above-described flat shoulder region 104 of the cylinder head 100 directly opposes a flat outer region 240 of the piston 210, effectively closing the space between the cylinder head 100 and the piston 210 and constraining combustion to more radially central locations. It is noted that the elliptical shape 140 (FIG. 1) is not visible from the perspective of FIGS. 2a and 2b. However, the width of the combustion chamber 220 as shown in FIGS. 2a and 2b corresponds approximately to the minor axis of the ellipse.

Also evident from FIGS. 2a and 2b is that the electrodes 132 of the spark plugs 130 extend into the combustion chamber 220. For example, a main body of the spark plugs 130 may be flush with the interior surface 102, with the electrodes 132 extending into a main volume of the combustion chamber 220. The depicted arrangement promotes rapid propagation of flame fronts and differs from many prior designs, where electrodes are recessed (placed higher), resulting in slower combustion.

To further promote efficient combustion, the piston 210 may include one or more depressions 230 located beneath the electrodes 132 of the spark plugs 130. In some examples, the depression(s) 230 may be a single depression that extends completely around the top surface of the piston 210, e.g., in an annular-type manner. In other examples, two independent depressions 230 may be formed, one beneath each electrode 132. In some examples, a central elevated region 232 may be formed in the piston 210 between the electrodes. The elevated region 232 limits the volume of the combustion chamber 220 while still allowing flame fronts to develop by virtue of the depression(s) 230.

Figure 3:
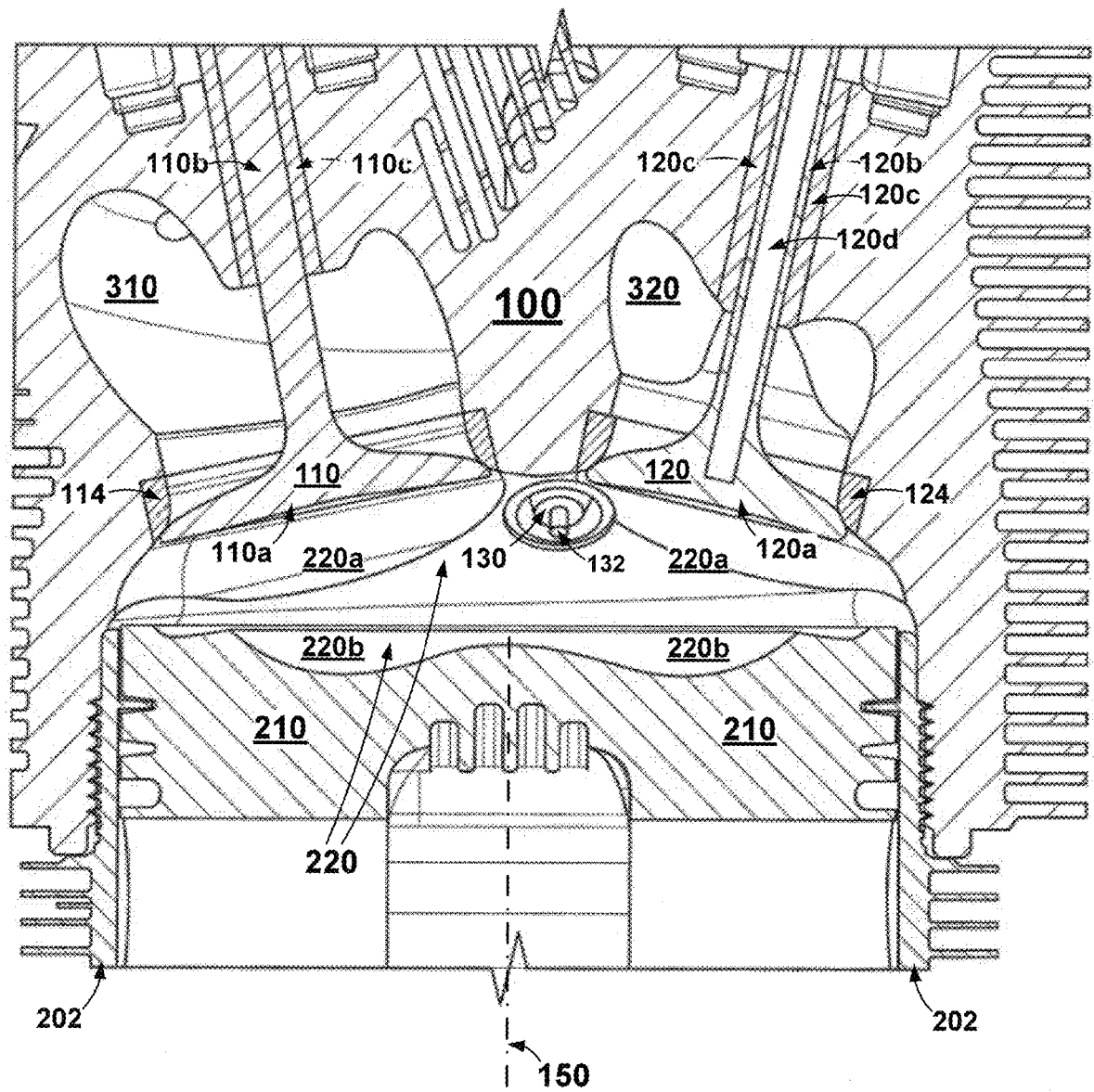
FIG. 3 is a sectional, side view of the embodiment of FIG. 1, with the section taken along a plane of the valves of FIG. 2.

FIG. 3 shows a cross-sectional view of the engine, with the section taken through the valves 110 and 120. Visible in FIG. 3 is an intake port 310, for supplying intake air to the combustion chamber 220 via the intake valve 110, and an exhaust port 320, for conveying exhaust gases out of the combustion chamber 220 via the exhaust valve 120. In some examples, the intake port 310 is a high-tumble port constructed and arranged to induce vertical currents of fuel and air within the combustion chamber 220.

FIG. 3 further shows additional details of the valves 110 and 120. Here, the intake valve 110 is closed against the intake valve seat 114. The intake valve 110 includes an intake valve head 110a and an intake valve stem 110b. The intake valve stem 110b is surrounded, over at least a portion of its length, by an intake valve-stem guide 110c. Likewise, the exhaust valve 120 is seen to include an exhaust valve head 120a and an exhaust valve stem 120b. The exhaust valve stem 120b is surrounded, over at least a portion of its length, by an exhaust valve-stem guide 120c. In an example, the exhaust valve stem 120b includes a hollow region 120d which contains sodium. When the exhaust valve stem 120b heats, the sodium melts and sloshes within the hollow region 120d, picking up heat from the exhaust valve head 120a. The heat is transferred up the valve stem 120b and laterally to the valve guides 120c and then into the cylinder head 100.

In an example, the valve stems 110b and 120b each have a diameter of less than 9 mm and, in some cases, less than 8 mm. In an example, the intake valve 110 has a mass less than 145 grams (e.g., 130 grams) and the exhaust valve 120 has a mass less than 130 grams (e.g., 104 grams).

In some examples, the intake valve stem guide 110c is composed of at least 55% copper. Likewise, the exhaust valve stem guide 120c is composed of at least 20% copper. The materials could be provided as a uniform solid alloy or as a powdered metal, for example.

In some examples, the valve seats 114 and 124 are each composed of a minimum of 15% copper and can be produced as a powdered metal or a uniform solid alloy.

Figure 4:
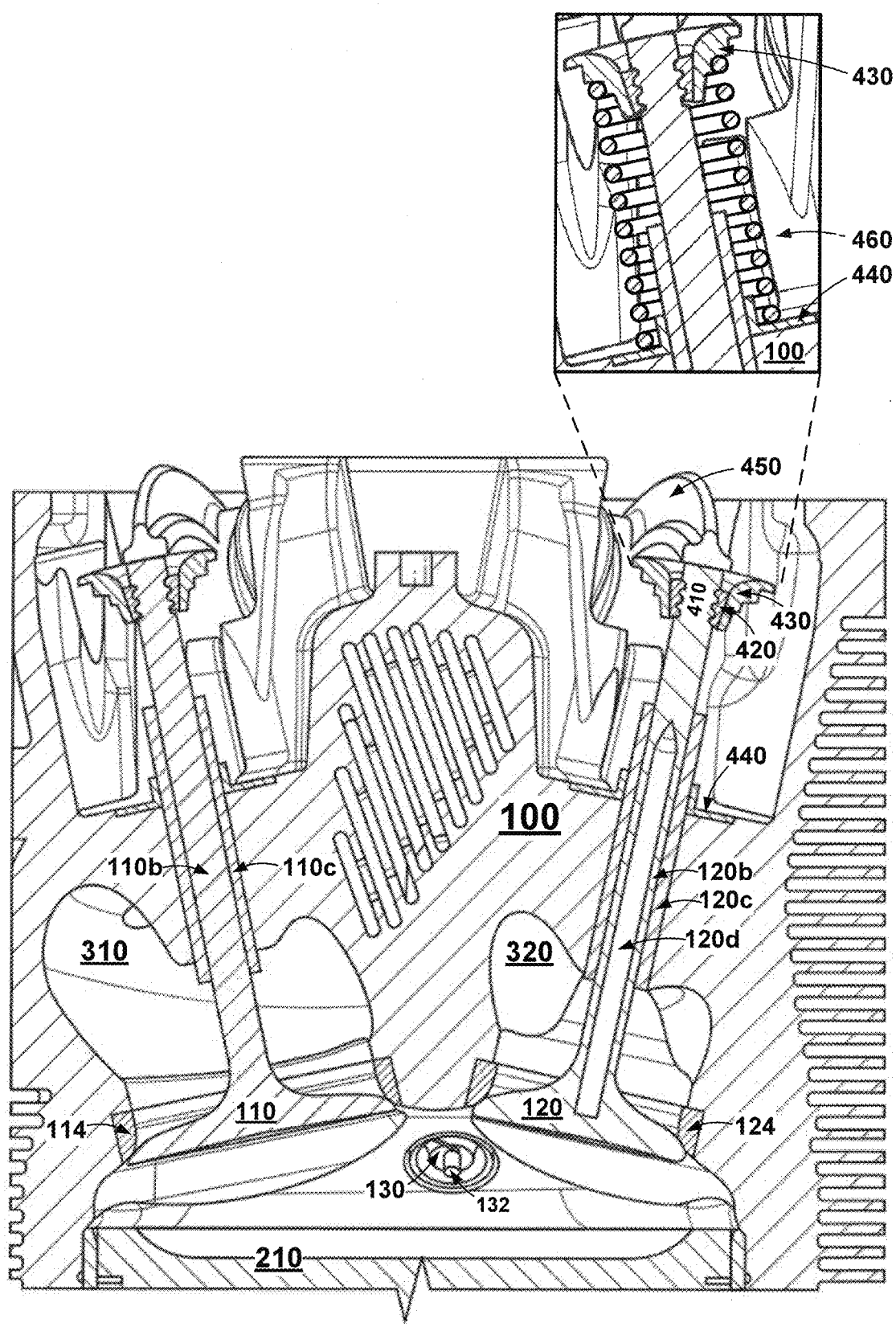
FIG. 4 is a sectional, side view of the embodiment of FIG. 1, showing a triple-bead arrangement for valve stems.

FIG. 4 shows another cross-sectional view of the cylinder head 100. As with FIG. 3, the section is taken through the valves 110 and 120. As shown at the upper-right of FIG. 4, a top of the exhaust valve stem 120b includes a triple-bead geometry 410, such as three concentric rounded grooves. A triple-bead key 420 engages the triple-bead geometry of 410. The triple-bead key 420 is fixedly attached to (e.g., wedged into) a upper spring seat 430. A helical spring (not shown) is held in compression between the upper spring seat 430 and a lower spring seat 440. The spring may be concentric with the valve stem 120b and acts to push the valve retainer 430 up, ensuring that the valve head 120a is biased upwardly against the valve seat 124. A rocker 450 is configured to push down repetitively on the valve stem 120b as the rocker pivots up and down in response to rotation of a camshaft (not shown). When the rocker 450 pushes down, the retainer 430 compresses the spring and pushes the valve 120 open. When the rocker 450 stops pushing down, the spring pushes the retainer 430 back up, causing the valve 120 to close.

The triple-bead key 420 holds the triple-bead geometry 410 of the valve stem 120b without concentrating stress in a single area, as would be the case with a single-bead or a rotator valve construction. The triple-bead construction is thus well suited for the narrow and light valve stem 120b, which might otherwise wear prematurely or break during normal operation.

Preferably, the triple-bead key 420 does not fit tightly onto the triple-bead lock 410 but rather maintains a small amount of radial and axial clearance. For example, a clearance of 0.05 mm may be maintained between the triple-bead geometry 410 and the triple-bead key 420. The clearance enables the valve stem 120b, and thus the entire valve 120, to rotate within the retainer 430. Rotation may be achieved incrementally on successive compressions of the spring. For example, the helical spring provides slight rotation each time it is compressed. Some of the rotation is imparted to the valve stem 120b, which may rotate, e.g., at a rate of between 0.25 and 5 rotations per minute. Rotation of the valve 120 in this manner tends to distribute heat more evenly within the valve head 120a and tends to wipe clean any deposits that form in the sealing area between the valve head 120a and the valve seat 124.

Although the triple-bead arrangement has been described in connection with the exhaust valve 120, a similar or identical arrangement may be used with the intake valve 110. Indeed, FIG. 4 shows the same features on both valves. Thus, both the intake valve 110 and the exhaust valve 120 may benefit from the durability and valve-rotation afforded by the triple-bead construction.

Although a triple-bead construction is specifically shown, some embodiments may employ greater than three beads. For example, a quadruple-bead construction may be used. It should be appreciated, though, that any multi-bead arrangement having greater than two beads necessarily includes a triple-bead construction.

Figure 5:
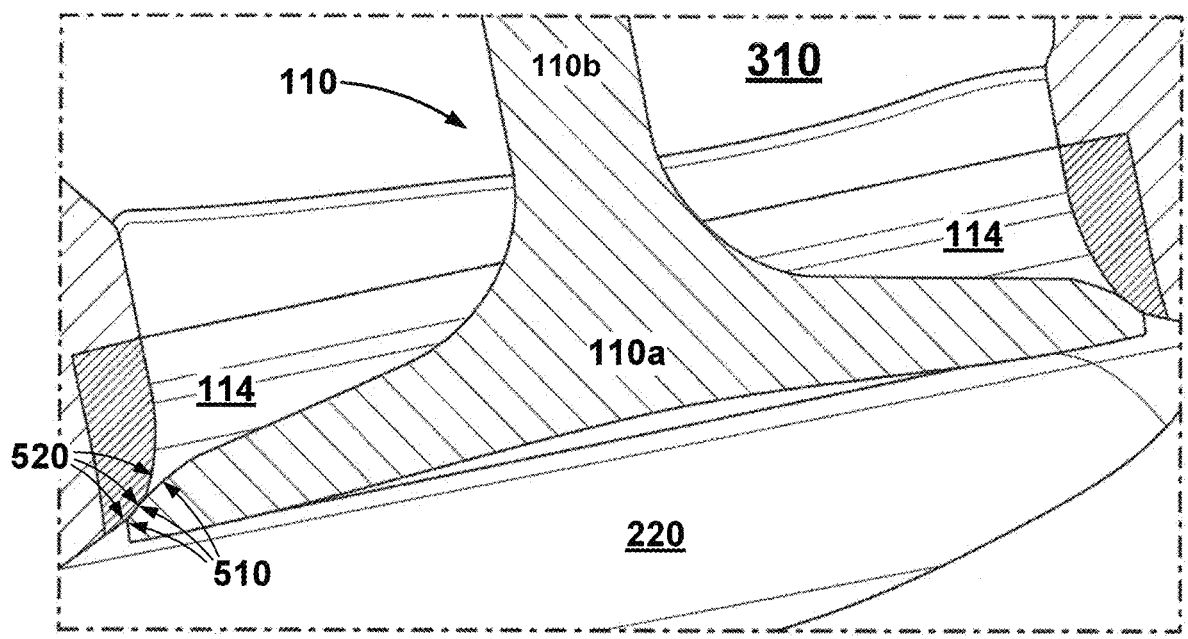
FIG. 5 is a magnified view of a portion of FIG. 3, showing an example contact area between a valve head and a valve seat.

FIG. 5 is a cross-sectional view of the intake valve 110 closed against the intake valve seat 114. As shown in FIG. 1, the intake valve seat 114 is a ring that extends completely around the intake valve opening 112 and lines that opening.

As shown to the left of FIG. 5, the valve head 110a has multiple discretely angled surfaces 510, with each surface extending completely around the outside of the intake valve head 110a. In a complementary manner, the valve seat 114 has multiple discretely angled surfaces 520, which extend completely around the inside of the valve seat 114. One of the surfaces 510 maintains contact with a corresponding one the surfaces 520 to effectively seal the valve head 110a against the valve seat 114 when the valve 110 is closed. As temperatures rise, the radial contact area between the two surfaces may change but the surfaces' tangential contact remains.

The multi-angled surfaces 510 and 520 promote smooth and efficient airflow between the intake port 310 and the combustion chamber 220 when the valve 110 is open. For example, air is efficiently funneled through a gap that forms between the surfaces 510 and 520. The surfaces 510 and 520 thus facilitate the introduction of air into the combustion chamber 220, promoting efficient combustion.

Although the example of FIG. 5 relates to the intake valve 110 and the intake valve seat 114, the exhaust valve head 120a and exhaust valve seat 124 may be arranged in a similar or identical manner. Thus, the exhaust valve head 120a and exhaust valve seat 124 may each include multiple discretely angled surfaces as described above. Exhaust gases may thus follow a similarly smooth path from the combustion chamber 220 to the exhaust port 320 (FIG. 3).

Having described certain embodiments, numerous alternative embodiments or variations can be made. For example, although embodiments have been described in relation to air-cooled engines, the same principles may be applied in liquid-cooled engines. Thus, the features described herein are not limited to air-cooled engines.

Further, although features have been shown and described with reference to particular embodiments, such features may be included and hereby are included in any of the disclosed embodiments and their variants. Thus, it is understood that features disclosed in connection with any embodiment are included in any other embodiment.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

Table of Reference Numerals

| Reference Numeral | Description |
|---|---|
| 100 | Cylinder head |
| 102 | Interior surface of cylinder head |
| 104 | Flat shoulder region of cylinder head |
| 110 | Intake valve |
| 110a | Intake valve head |
| 110b | Intake valve stem |
| 110c | Intake valve stem guide |
| 112 | Intake valve opening |
| 114 | Intake valve seat |
| 120 | Exhaust valve |
| 120a | Exhaust valve head |
| 120b | Exhaust valve stem |
| 120c | Exhaust valve stem guide |
| 120d | Hollow region that contains sodium |
| 122 | Exhaust valve opening |
| 124 | Exhaust valve seat |
| 130 | Spark Plug |
| 132 | Electrodes of spark plug |
| 140 | Elliptical shape of combustion chamber |
| 142 | Major axis of ellipse |
| 150 | Center line of cylinder bore |
| 152 | Radial distance to electrodes of top spark plug |
| 154 | Radial distance to electrodes of bottom spark plug |
| 156 | Radius of cylinder bore |
| 200 | Cylinder bore having diameter as indicated |
| 202 | Cylinder barrel |
| 210 | Piston |
| 220 | Combustion chamber |
| 220a | Upper region of combustion chamber |
| 220b | Lower region of combustion chamber |
| 230 | Depression |
| 232 | Elevated region |
| 240 | Flat outer region of piston |
| 310 | High-tumble intake port |
| 320 | Exhaust port |
| 410 | Triple-bead lock on valve stem |
| 420 | Triple-bead key |
| 430 | Valve retainer (upper spring seat) |
| 440 | Lower spring seat (enables spring (not shown) to push up on valve retainer |
| 450 | Rocker (coupled to camshaft) |
| 510 | Multiple discretely angled surfaces of valve head |
| 520 | Multiple discretely angled surfaces of valve seat |

What is claimed is:

1. An engine, comprising:
   an engine block having a cylinder bore that contains a piston constructed and arranged to move reciprocally within the cylinder bore; and
   a cylinder head having an interior surface that faces the cylinder bore, the interior surface having an intake valve opening, an exhaust valve opening, a first crescent-shaped squish region, and a second crescent-shaped squish region, wherein the intake valve opening and the exhaust valve opening are disposed between the first crescent-shaped squish region and the second crescent-shaped squish region, and wherein the first crescent-shaped squish region and the second crescent-shaped squish region are constructed and arranged to direct more of an air-fuel mixture toward the exhaust valve opening than toward the intake valve opening during compression;

wherein an elliptical combustion chamber is disposed between the first crescent-shaped squish region and the second crescent-shaped squish region, the elliptical combustion chamber extending over a cross-sectional area smaller than a cross-sectional area of the cylinder bore.

2. The engine of claim 1, wherein the elliptical combustion chamber extends to respective ends of the cylinder bore, and wherein the first crescent-shaped squish region is disposed on one side of a major axis of the elliptical combustion chamber and the second crescent-shaped squish region is disposed on another side of the major axis.

3. The engine of claim 2, wherein the intake valve opening is disposed on one side of a minor axis of the elliptical combustion chamber and the exhaust valve opening is disposed on another side of the minor axis, and wherein the elliptical combustion chamber is asymmetrical about the minor axis to direct more of the air-fuel mixture toward the exhaust valve opening than toward the intake valve opening during compression.

4. The engine of claim 3, wherein the intake valve opening and the exhaust valve opening intersect the major axis.

5. The engine of claim 1, wherein a minor axis of the elliptical combustion chamber separates the cylinder head into an intake side and an exhaust side, the intake valve opening being disposed on the intake side and the exhaust valve opening being disposed on the exhaust side, and wherein the first crescent-shaped squish region and the second crescent-shaped squish region extend over a greater area on the exhaust side than on the intake side to direct more of the gases toward the exhaust side than toward the intake side during compression.

6. The engine of claim 1, wherein the exhaust valve opening is smaller than the intake valve opening.

7. The engine of claim 1, wherein the piston includes a top surface that faces the interior surface of the cylinder head, the top surface having a first raised outer region, a second raised outer region, and a depression that is depressed relative to the first raised outer region and the second raised outer region, and wherein the first raised outer region and the second raised outer region directly oppose the first crescent-shaped squish region and the second crescent-shaped squish region, respectively, to direct the air-fuel mixture toward the elliptical combustion chamber during compression.

8. The engine of claim 7, wherein the interior surface of cylinder head further has a raised dome portion that extends downwardly toward the first crescent-shaped squish region and the second crescent-shaped squish region, and wherein the elliptical combustion chamber is formed between the raised dome portion and the depression.

9. The engine of claim 8, wherein the piston further includes a centrally disposed raised portion surrounded by the depression, and wherein the centrally disposed raised portion directly opposes the raised dome portion to form a kidney-shaped cross-sectional area when the piston is in an uppermost position within the cylinder bore.

10. The engine of claim 1, wherein the elliptical combustion chamber has a perimeter that maintains a convex curvature entirely around the elliptical combustion chamber.

11. A method of operating an engine, the engine including:

an engine block having a cylinder bore that contains a piston constructed and arranged to move reciprocally within the cylinder bore, and a cylinder head having an interior surface that faces the cylinder bore, the interior surface having an intake valve opening, an exhaust valve opening, a first crescent-shaped squish region, and a second crescent-shaped squish region, wherein the intake valve opening and the exhaust valve opening are disposed between the first crescent-shaped squish region and the second crescent-shaped squish region, the method comprising:

moving the piston to compress an air-fuel mixture inside the cylinder bore such that the first crescent-shaped squish region and the second crescent-shaped squish region direct more of the air-fuel mixture toward the exhaust valve opening than toward the intake valve opening; and as the piston approaches an uppermost position within the cylinder bore, igniting the air-fuel mixture to provide mechanical power;

wherein an elliptical combustion chamber is disposed between the first crescent-shaped squish region and the second crescent-shaped squish region, the elliptical combustion chamber extending over a cross-sectional area smaller than a cross-sectional area of the cylinder bore.

* * * * *